(12) United States Patent
Hatton

(10) Patent No.: US 6,797,159 B2
(45) Date of Patent: Sep. 28, 2004

(54) APPARATUS FOR RECIRCULATING VORTEX WATER FOUNTAIN

(76) Inventor: Randy M Hatton, HC 71 Box 17A, Eagle Nest, NM (US) 87718

( * ) Notice: Subject to any disclaimer, the term of this patent is extended or adjusted under 35 U.S.C. 154(b) by 0 days.

(21) Appl. No.: 10/264,532

(22) Filed: Oct. 4, 2002

(65) Prior Publication Data

US 2003/0070991 A1 Apr. 17, 2003

Related U.S. Application Data

(60) Provisional application No. 60/330,129, filed on Oct. 16, 2001.

(51) Int. Cl.$^7$ .............................. C02F 1/48; B04C 3/00
(52) U.S. Cl. ..................... 210/97; 210/143; 210/188; 210/195.1; 210/222; 210/223; 210/257.1; 210/258; 210/512.1
(58) Field of Search ................................. 210/695, 787, 210/805, 143, 194, 512.1, 97, 188, 195.1, 222, 223, 257.1, 258, 744

(56) References Cited

U.S. PATENT DOCUMENTS 5,804,068 A * 9/1998 Reed ........................ 210/222

* cited by examiner

Primary Examiner—David A. Reifsnyder
(74) Attorney, Agent, or Firm—G. F. Gallinger

(57) ABSTRACT

An apparatus for treating water through a magnetic field comprises an inverted vortexing ampul capable of holding water, the vortexing ampul having a wide body and a narrow neck. A water inlet located inside the vortexing ampul at its wide body portion is used to introduce water along an inner side of the vortexing ampul thereby facilitating flow in a vortexing pattern. A valve controls the flow of water. A pair of axially placed magnets are aligned around the neck of the ampul. A recirculating ampul for the collection of the treated or "living water" is included. A collar of paramagnetic material may be located close to the axially placed magnets. The apparatus includes a circulating system that pumps processed water from the recirculating ampul for reprocessing.

9 Claims, 1 Drawing Sheet

APPARATUS FOR RECIRCULATING VORTEX WATER FOUNTAIN

CROSS REFERENCE TO RELATED APPLICATIONS

This application claims the benefit of U.S. Provisional Application No. 60/330,129, filed Oct. 16, 2001, which is incorporated herein by reference in its entirety.

BACKGROUND OF THE INVENTION

This invention relates to an apparatus for processing liquids. More particularly, to an apparatus designed for manufacturing "living water".

Magnetic treatment of fluids is known in the prior art. Typically, a magnetic field that reacts with magnetic fluid sensitive particles within a fluid is applied to the fluid passing through a pipe. This coupling leads to a multitude of beneficial effects. Many fluids traveling through conduits contain magnetic field sensitive particles that tend to cling to the inside walls of the pipe. Such fluids include beer, wine, liquor, soda, juices, hydrocarbon fuels, and even water.

Water, being dipolar, can be partly aligned by an electric field which has been shown by the movement of a stream of water by an electrostatic source S. T. Bramwell, Ferroelectric ice, Nature 397 (1999) 212–213. Water is diamagnetic and may be levitated in very high magnetic fields (10 T, c.f. Earth's magnetic field 30 uT) Y. Ikezoe, N. Hirota, J. Nakagawa and K. Kitazawa, Making water levitate, Nature 393 (1998) 749–750. Lower magnetic fields (0.2 T) have been reported to increase the number of monomer water molecules K. X. Zhou, G. W. Lu, Q. C. Zhou, J. H. Song, S. T. Jiang and H. R. Xia, Monte Carlo simulation of liquid water in a magnetic field, J. App. Phys. 88 (2000) 1802–1805.

Magnetic treatment of water has been shown to change the morphology of calcium carbonate crystals found therein. The effect of the treatment is to change the crystals from dendritic forms to smaller disk-shaped forms. It is believed that the magnetic field affects the hydrogen bonds of the water. The effect of the magnets on the water is amplified by repeated passages of the water by the magnets such that some of the hydrogen bonds of the water complex breaks. The idea is that the breaking up of the $(H_2O)_n$ complexes somehow releases dissolved ions that promote nucleation of the smaller crystals. Klaus J. Kronenberg: "Experimental evidence for the effects of magnetic fields on moving water." IEEE Transactions on Magnetics, Vol MAG-21, No. 3, September 1985 (2059–2061). According to Kronenberg, magnetic fields can reduce the surface tension and viscosity of water by up to 2%.

Devices which process fluid through a vortex or magnetic field are known. U.S. Pat. No. 5,836,485 discloses a method and apparatus for controlling the flow of material using an electromagnetic valve. The device is used with magnetic material such as toner particles.

U.S. Pat. No. 4,805,669 discloses an electromagnetic valve for dispensing material from a container. This device is used with molten metal.

U.S. Pat. No. 5,687,766 discloses a cup shaped apparatus for forming a vortex. This apparatus is limited for use as a cushion or support for transporting products by means of the vortex.

U.S. Pat. No. 5,311,907 discloses a vortex driven fluid transfer system for moving nuclear material from one tank to another. This device is limited by its provisions of having no moving parts and relying on a jet ejector to transfer the fluids.

U.S. Pat. No. 4,995,425 discloses a magnetic apparatus for keeping compounds such as calcium carbonate in solution by exposing the fluid to a magnetic field. The magnetic device is used with a housing that contains a reflecting shields for directing the magnetic flux toward the center of the magnetic fluid conditioner.

U.S. Pat. No. 4,145,291 discloses an apparatus for disinfecting drinking water by flowing the water into a ceramic container with silver ions that are dispersed throughout a ceramic holding reservoir.

U.S. Pat. No. 2,775,486 discloses a filler apparatus that forms a conical stream for dispenses liquids of varying viscosity into a container. This apparatus is designed to prevent foaming by liquids otherwise predisposed to foaming as they are introduced into a fill container.

U.S. Pat. No. 2,763,125 discloses a means for manipulating the path of ionized gaseous fluids escaping from the nozzle of a jet power unit using an electric and or magnetic field. This device is used with jet propulsion systems.

U.S. Pat. No. 6,164,332 discloses a device for flowing water in a vortex pattern through a magnetic field to a holding tank. The processed water flows to a holding tank where it is stored. The device is used in a pressurized environment for dispensing the processed water to users.

SUMMARY OF INVENTION

The present device is an improved magnetic water treatment apparatus. Water is induced into a vortex, flows through a magnetic field and an optional paramagnetic collar. Water recirculates through the system four or more times to produce "living water".

It is an object of the invention to provide an apparatus capable of manufacturing "living water".

It is yet another object of the present invention to provide an apparatus that recirculates "living water" and that is dispensed without having to be pressurized.

It is yet another object of the present invention to provide a novelty device and in particular to a novelty devise with a pleasing visual effect of the vortexing "living water".

These and other objects are met by an apparatus designed to vortex water past magnets thereby manufacturing magnetized water. In accordance with one aspect of the present invention, there is provided an apparatus for processing "living water" that includes, an ampul capable of holding water, the ampul having a wide body and a narrow neck, the ampul having an inner surface causing water delivered to the ampul to flow in a vortex; one or more water inlets capable of delivering water to the apparatus; a recirculating ampul for collecting the "living water" from the vortexing ampul; one or more pairs of magnets aligned around the neck of the ampul; a circulating system that pumps processed water from the recirculating ampul to the vortexing ampul for reprocessing, the circulating system comprising one or more pumps and a conduit connected to the recirculating ampul at one end and the vortexing ampul at the other end; and one or more flow valves connected to the apparatus to control the flow of water through the apparatus.

During use water is processed by dispensing water to a vortexing ampul along the sides of the ampul; flowing the water down the vortexing ampul in a vortex pattern toward the narrow neck; processing the water through a magnetic field created by one or more pairs of magnets; collecting the processed water in a recirculating ampul; recirculating the water from the recirculating ampul to the vortexing ampul; reprocessing the water through the vortexing ampul and the magnetic field; and dispensing the water through one or more spigots.

DETAILED DESCRIPTION OF THE INVENTION

Figure 1:
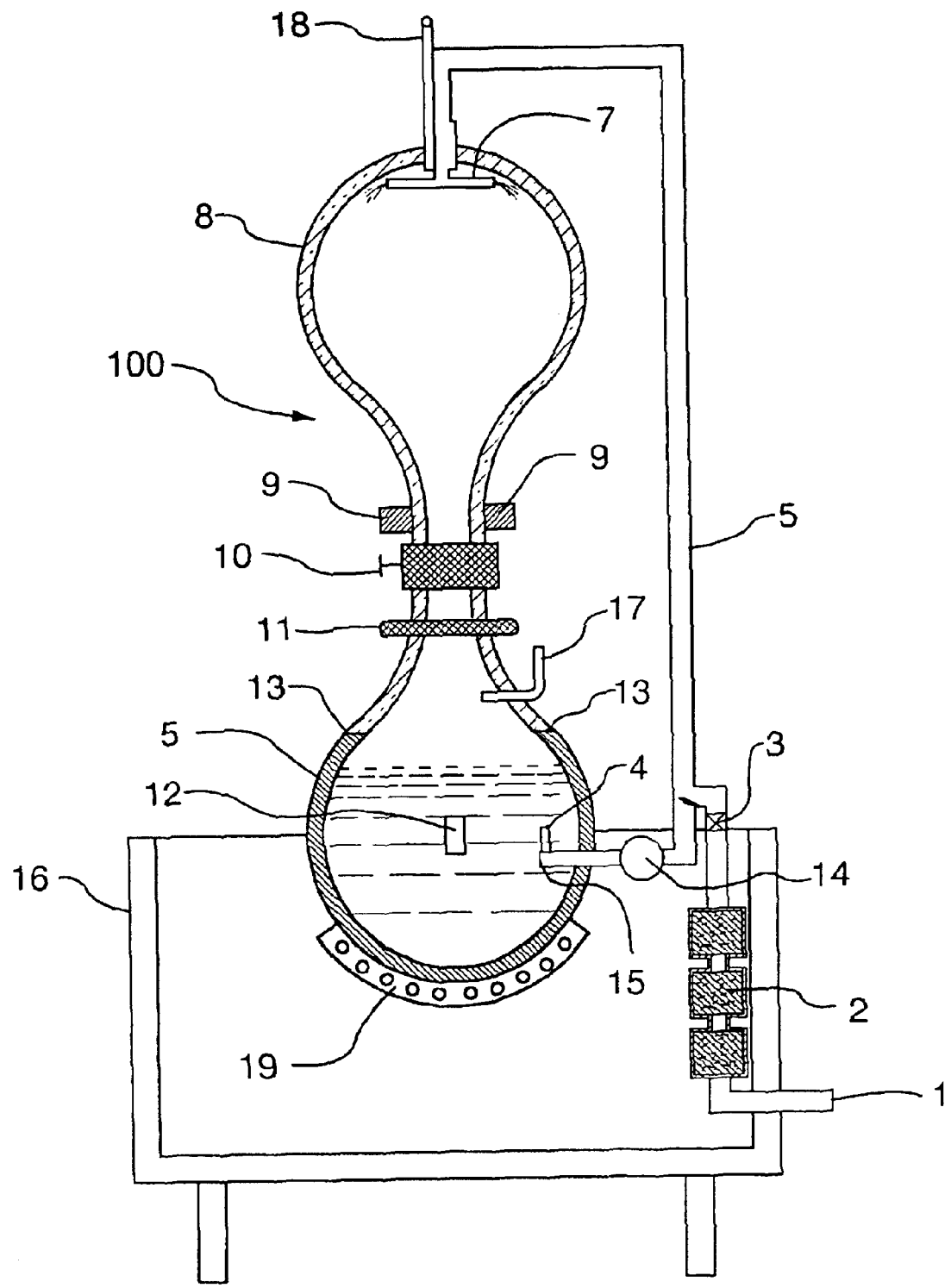
FIG. 1 is an illustration of a recirculating vortex water fountain apparatus

Referring now to FIG. 1, there is illustrated one embodiment of a device 100 for producing and dispensing a periodically or continuously recirculating supply of "living water". Untreated water from a supply line 1 flows through one or more filters 2 which may be the same or of different types commercially available. When the level of water is identified as low by an observer, a control valve 3 may be opened to permit the flow of untreated water from supply line 1 through a vertical pipeline 6, then through a water inlet opening 7 and into a vortexing ampul 8. Alternatively, water may be added manually through water inlet 17. The influx of water from supply line 1 may be additionally governed by a water level sensor 4, located within a recirculating ampul 5, which opens and closes a flow control valve 3. The water level sensor also controls the operation of the recirculating pump 14. The sensor located in the recirculating ampul senses when "living water" falls below a predetermined level, as set by water level sensor 4, the recirculating pump 14 shuts off while flow control valve 3 opens to permit the flow of untreated water from supply line 1 through a vertical pipeline 6, then through a water inlet opening 7 and into a vortexing ampul 8 creates. The water so introduced into vortexing ampul 8 thus creating a vortex motion of the water which flows by gravity in a vortex motion through a narrow neck area connecting the vortexing ampul 8 and the recirculating ampul 5. The water passes through the neck of the ampuls about which is one or more pairs of axially aligned magnets 9 and one or more paramagnetic collars 11 containing a paramagnetic compound such as MAGNASOIL and then into the recirculating ampul 5. The volume of water and the speed of the vortex flow thereof is controlled by a flow control valve 10, which may be manually adjusted. Control valve 10 is positioned intermediate the narrow neck area between vortexing ampul 8 and recirculating ampul 5 at a connecting juncture there between. "Living water" so produced may be drawn from a dispensing spigot 12 positioned in the recirculating ampul 5.

Adjacent to the water inlet 7 on the vortexing ampul 8 is a gas exchange portal 18 located on the upper most portion of the vortexing ampul.

Recirculating ampul 5 is sectioned by an airtight or waterproof seal 13 that permits initial assembly of recirculating ampul 5 and subsequent disassembly thereof for maintenance purposes. Recirculating ampul 5 may be of any chosen size, but in order to maintain portability of water fountain apparatus 100, a capacity of approximately three to five gallons is believed optimal. A base platform 16, which is not part of the present invention, serves to support the water fountain apparatus 100. Located on the recirculating ampul 5 is water inlet 17 for introducing a supply of water into the apparatus. The water is recirculated from recirculating ampul 5 through a conduit that connects to the recirculating ampul at one end 15 and to the vortexing ampul at the other end.

Another aspect of the present invention is a device designed to manufacture "living water" for use in a drinking fountain. The apparatus is for manufacturing "living water". Water supplied to the apparatus is potable and may be provided manually to the water inlet 17 located on the recirculating ampul 5. Alternatively supply water can be introduced to the apparatus via an in-line system. In this embodiment, two ampuls are vertically aligned and connected together in an end-to-end manner to enable water to flow via gravity from an upper ampul also known as a vortexing ampul to a lower ampul also known as a recirculating ampul. Each ampul includes a wide body and an integrally formed, narrow neck that transports water from the wide body of the vortexing ampul to the wide body on the lower ampul. The shape of the ampuls can be oval, egg shaped, funnel shaped, and bulbous shaped. The vortexing ampul and the recirculating ampul can be of the same size and shape or a different size and shape. The vortexing ampul receives water from a fixed water inlet located inside the upper section of the body. The recirculating ampul receives water from a water inlet located on its upper section of the body. The water inlet may include one or more lateral arms with outlet ports formed therein that are located adjacent to the inside surface of the ampul so that water delivered to the water inlet begins flowing downward in a circular pattern along the inside of the vortex ampul. The vortex gradually narrows towards the neck so that water flowing downward in a vortex ampul flows rapidly in a vortex pattern through the neck.

A recirculating ampul 5, positioned beneath the neck of the inverted vortexing ampul 8, is used for collecting the magnetically treated water, which is sometimes referred to as "living water". The recirculating ampul 5 is used for dispensing drinking water or for other uses. The receiving container is shaped and sized to fit the intended use. For example, if the intended use is to supply drinking water for human consumption, the recirculating ampul 5 may have various shapes including decorative shapes. In one embodiment, the recirculating ampul 5 is shaped to be roughly the mirror image of the treating ampul. The recirculating ampul 5 may include valves or other means for dispensing the treated water. The recirculating ampul 5 may also include water level detection means to stop or start the flow of water through the vortexing ampul 8 based on preset water levels. Further the back recirculating ampul 5 includes means for recycling water back through the vortexing ampul 8.

Optionally, the apparatus rests upon a support. The support may include a cooling component 19 that cools the recirculating ampul. The cooling component may be powered by AC, DC or solar energy.

Disposed around the neck of one or more ampuls are one or more pairs of axially aligned magnets designed to create a magnetic field around the water as it flows through the neck of an ampul. An optional collar of paramagnetic material may be positioned around the neck to remove harmful contaminants from the water.

Another embodiment of the apparatus is designed to be portable. Since the apparatus is portable, it will not be plumbed into a commercial supply line of water.

Optionally, the recirculating ampul may include sensors that communicate with a sensor valve located on the supply water line that automatically controls the flow of water through the apparatus when the "living water" located inside the recirculating ampuls drops below a desired level.

A sensor valve in the recirculating ampul permits the flow of water from the supply line whenever the level of "living water" in the recirculating ampul falls below a predetermined level. The flow of the water in a vortex pattern is facilitated by the shape of the ampul. One or more sensors located in the recirculating ampul senses the level of the water therein. The sensor communicates with a control valve for controlling the flow of water from outside the system. When the sensor senses that the level of water is below the desired amount, the sensor communicates with the control valve whereby the control valve opens to allow water from outside the system to flow to the ampul, thereby increasing the overall volume of water to the system. Once the desired level of water in the system is obtained, the sensor sends a message to the control valve and the flow of water from outside the system is shut off. The supply water line is optionally is equipped with a series of filters installed in-line to remove particulates and further treat the water.

The device includes an inlet port for connecting to a potable water supply line. A paramagnetic collar may be added around the neck of either the vortexing ampul or lower ampul also known as the recirculating ampul. The paramagnetic material known as MAGNA SOIL and obtained from Mind Surgery Virgin Waters Limited, Eatonville Wash. Circulation of the "living water" so produced is provided by means of a recirculating pump. The pumps are powered by AC, DC and solar energy In accordance with one embodiment of the present invention, a collar of paramagnetic material is located close to the axially placed magnets. The collar containing paramagnetic material may be placed on the outside of the apparatus where the treated water does not contact the collar of paramagnetic material as water flows through the treating ampul. In another embodiment, the collar of paramagnetic material is in contact with the water as water flows through to the receiving container. The collar must be non water permeable.

In addition, the system contains a recirculator that takes processed water in the recirculating ampul and sends it to the vortexing ampul to be recirculated through the system four or more times. By recirculating the water through the vortex and past the magnets and paramagnet material, the water is reprocessed whereby the water is exposed to one or more Gauss of magnetic force through each pass of the process. The "living water" is recirculated through the apparatus either continuously or at intervals. The "living water" is dispensed from the recirculating ampul for use.

In another embodiment the ampul 5,8 will be transparent, opaque translucent, colored, colorless, or a combination thereof. The material that the ampuls 5,8 are made from should be a non-magnetic material such as glass, ceramic, clay, plastic, copper, brass, silver, aluminum or a combination thereof.

Yet another feature of the present invention is its use as a display device for producing visual effects suitable for use as a toy and novelty device. The vortex of water that is formed in the ampul and flows to the recirculating ampul produces a pleasing visual image. The height and speed of the vortex is varied as the diameter of the neck size is changed through the control valve. The visual effect produced by the relative movement of the water is obtained by flow of the water in a vortex pattern induced by gravity and the shape of the ampul.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. An apparatus for recirculating water through a magnetic field comprising:

an inverted vortexing ampul capable of holding water, the vortexing ampul having a wide body, a narrow neck, and an inner surface causing water delivered thereto to flow in a vortex;

a water inlet capable of delivering water to the apparatus;

a water outlet capable of delivering water from the apparatus;

a recirculating ampul positioned beneath the inverted ampul for collecting water from the vortexing ampul, the recirculating ampul having a body and a neck;

one or more pairs of magnets aligned around the neck of one of ampuls;

a circulating system that pumps processed water from the recirculating ampul to the vortexing ampul for reprocessing, the circulating system comprising one or more pumps and a conduit having two ends, one end connected to the recirculating ampul and the other end connected to the vortexing ampul; and one or more flow valves connected to the apparatus to control the flow of water through the apparatus.

2. An apparatus as in claim 1, wherein one or more collars of paramagnetic material are located close to one of the pairs of axially aligned magnets.

3. An apparatus as in claim 1, wherein the recirculating ampul also has a wide body and narrow neck dimensioned to matingly connect to the vortexing ampul.

4. An apparatus as in claim 1, wherein the vortexing ampul is made of a ion-magnetic material.

5. An apparatus as in claim 1, wherein the apparatus contains one or more gas exchange portals.

6. The apparatus of claim 3, wherein a bottom portion of the wide body of the recirculating ampul is removably attached to an upper portion of the wide body of the recirculating ampul for maintenance purposes.

7. The apparatus of claim 1, wherein water is supplied to the apparatus through a water supply line having one or more filters.

8. The apparatus of claim 1, further comprising a water level sensor located inside the recirculating ampul and a flow valve connected to the water supply line, to control the water level sensor so that water delivered to the recirculating ampul is controlled by the amount of water in the recirculating ampul.

9. An apparatus for circulating water through a magnetic field comprising:

an inverted vortexing ampul capable of holding water, the vortexing ampul having a wide body, a narrow neck, and a inner surface;

a water inlet opening located inside the vortexing ampul at an upper portion of the wide body, a water dispensing unit capable of dispensing water delivered to the vortexing ampul along the inner surface of the vortexing ampul thereby facilitating the flow of water in a vortex pattern;

a recirculating ampul positioned beneath the vortexing ampul to collect the water therefrom, the recirculating ampul having a wide body and a narrow neck, the narrow neck of the recirculating ampul being vertically aligned with the narrow neck of the vortexing ampul and connected thereto with a watertight seal;

one or more pairs of magnets axially aligned around the narrow neck of one of the ampuls;

a circulating system that pumps processed water from the recirculating ampul to the vortexing ampul for reprocessing, the circulating system comprising one or more pumps, and a conduit having one end connected to the recirculating ampul and the other end connected to the vortexing ampul;

one or more flow valves to control the flow of water through the apparatus;

one or more spigots positioned on the recirculating ampul for dispensing processed water;

a water inlet capable of delivering water to the apparatus;

a water outlet capable of delivering water from the apparatus; and, one or more gas exchange portals positioned about the apparatus.

* * * * *